(12) United States Patent
Kim et al.

(10) Patent No.: US 12,482,602 B2
(45) Date of Patent: *Nov. 25, 2025

(54) DIELECTRIC CERAMIC COMPOSITION AND MULTILAYER CERAMIC CAPACITOR COMPRISING THE SAME

(71) Applicant: SAMSUNG ELECTRO-MECHANICS CO., LTD., Suwon-si (KR)

(72) Inventors: Hyoung Uk Kim, Suwon-si (KR); Seung In Baik, Suwon-si (KR); Hyung Soon Kwon, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 147 days.

This patent is subject to a terminal disclaimer.

(21) Appl. No.: 18/237,256

(22) Filed: Aug. 23, 2023

(65) Prior Publication Data

US 2023/0411075 A1 Dec. 21, 2023

Related U.S. Application Data

(63) Continuation of application No. 17/540,641, filed on Dec. 2, 2021, now Pat. No. 11,776,748, which is a
(Continued)

(30) Foreign Application Priority Data

Jun. 14, 2019 (KR) .................. 10-2019-0070784

(51) Int. Cl.
*H01G 4/012* (2006.01)
*C04B 35/468* (2006.01)
(Continued)

(52) U.S. Cl.
CPC ....... *H01G 4/1227* (2013.01); *C04B 35/4682* (2013.01); *H01G 4/012* (2013.01); *H01G 4/248* (2013.01); *H01G 4/30* (2013.01)

(58) Field of Classification Search
CPC .......... H01G 4/30; H01G 4/1227; H01G 4/12; H01G 4/012; H01G 4/248; C04B 35/4682
(Continued)

(56) References Cited

U.S. PATENT DOCUMENTS

| | | | |
|---|---|---|---|
| 6,437,970 B1 | 8/2002 | Lee et al. | |
| 7,176,156 B2 | 2/2007 | Umeda et al. | |

(Continued)

FOREIGN PATENT DOCUMENTS

| | | | |
|---|---|---|---|
| CN | 1619727 A | 5/2005 | |
| CN | 102115329 A | 7/2011 | |

(Continued)

OTHER PUBLICATIONS

Korean Office Action dated Jan. 4, 2024 issued in Korean Patent Application No. 10-2019-0070784 (with English translation).
(Continued)

*Primary Examiner* — Arun Ramaswamy
(74) *Attorney, Agent, or Firm* — Morgan Lewis & Bockius LLP

(57) ABSTRACT

A dielectric ceramic composition and a multilayer ceramic capacitor including the same are provided. The dielectric ceramic composition includes a $BaTiO_3$-based base material main ingredient and an accessory ingredient, where the accessory ingredient includes dysprosium (Dy) and niobium (Nb) as first accessory ingredients. A total content of the Dy and Nb is greater than 0.2 mol and less than or equal to 1.5 mol based on 100 mol of titanium (Ti) of the base material main ingredient.

8 Claims, 3 Drawing Sheets

Related U.S. Application Data continuation of application No. 16/803,779, filed on Feb. 27, 2020, now Pat. No. 11,222,749.

(51) Int. Cl.
*H01G 4/12* (2006.01)
*H01G 4/248* (2006.01)
*H01G 4/30* (2006.01)

(58) Field of Classification Search
USPC .......... 361/301.4, 311, 321.1, 321.4, 321.5
See application file for complete search history.

(56) References Cited

U.S. PATENT DOCUMENTS

| | | | |
|---|---|---|---|
| 7,759,269 | B2 | 7/2010 | Takahashi |
| 11,127,532 | B2 | 9/2021 | Choi |
| 11,222,749 | B2 | 1/2022 | Kim |
| 11,538,631 | B2 | 12/2022 | Ham |
| 2005/0107241 | A1 | 5/2005 | Umeda et al. |
| 2007/0025060 | A1* | 2/2007 | Kim .............. H01G 4/1227 361/321.4 |
| 2009/0086407 | A1 | 4/2009 | Takahashi |
| 2010/0046140 | A1* | 2/2010 | Yamaguchi ........... B82Y 30/00 501/137 |
| 2011/0157769 | A1 | 6/2011 | Kang et al. |
| 2011/0164346 | A1* | 7/2011 | Tamura .............. H01G 4/1227 361/321.1 |
| 2013/0162100 | A1 | 6/2013 | Kang et al. |
| 2014/0268484 | A1 | 9/2014 | Kang et al. |
| 2016/0111213 | A1* | 4/2016 | Okamoto ............ C04B 35/638 361/301.4 |
| 2017/0190626 | A1 | 7/2017 | Yoon et al. |
| 2018/0182549 | A1* | 6/2018 | Koide ................. C04B 35/638 |
| 2019/0371528 | A1* | 12/2019 | Takashima ........... H01G 4/012 |
| 2020/0395172 | A1 | 12/2020 | Choi |
| 2020/0411240 | A1 | 12/2020 | Ham |

FOREIGN PATENT DOCUMENTS

| | | | |
|---|---|---|---|
| CN | 106941045 | A | 7/2017 |
| EP | 0315324 | A3 * | 10/1996 |
| JP | 57088608 | A | 6/1982 |
| JP | 58020780 | A | 2/1983 |
| JP | S61-099210 | A | 5/1986 |
| JP | H01-315904 | A | 12/1989 |
| JP | H05-054717 | A | 3/1993 |
| JP | H06-283026 | A | 10/1994 |
| JP | H06-302216 | A | 10/1994 |
| JP | H07-094019 | A | 4/1995 |
| JP | H09-157013 | A | 6/1997 |
| JP | 2000-159573 | A | 6/2000 |
| JP | 2000-516190 | A | 12/2000 |
| JP | 2003-526201 | A | 9/2003 |
| JP | 2013-136501 | A | 7/2013 |
| KR | 10-1998-0058945 | A | 10/1998 |
| KR | 10-2005-0048522 | A | 5/2005 |
| KR | 10-2005-0084713 | A | 8/2005 |
| KR | 10-2009-0033099 | A | 4/2009 |
| KR | 10-2014-0112779 | A | 9/2014 |
| WO | 98/054737 | A2 | 12/1998 |

OTHER PUBLICATIONS

Office Action issued Oct. 31, 2023 for corresponding Japanese Patent Application No. 2020-097911 (See English Translation).
Korean Office Action dated Aug. 22, 2024 issued in Korean Patent Application No. 10-2019-0070784 (with English translation).
U.S. Notice of Allowance dated Sep. 15, 2021 issued in U.S. Appl. No. 16/803,779.
U.S. Non-final Office Action dated Jun. 18, 2021 issued in U.S. Appl. No. 16/803,779.
U.S. Notice of Allowance dated Jun. 5, 2023 issued in U.S. Appl. No. 17/540,641.
Chinese Office Action dated Aug. 2, 2022 issued in Chinese Patent Application No. 202010341760.4 (with English translation).
U.S. Non-Final Office Action dated Feb. 7, 2023 issued in U.S. Appl. No. 17/540,641.

\* cited by examiner

DIELECTRIC CERAMIC COMPOSITION AND MULTILAYER CERAMIC CAPACITOR COMPRISING THE SAME

CROSS-REFERENCE TO RELATED APPLICATION(S)

This application is a continuation of U.S. patent application Ser. No. 17/540,641, filed on Dec. 2, 2021, now U.S. Pat. No. 11,776,748 issued on Oct. 3, 2023, which is a continuation of U.S. patent application Ser. No. 16/803,779, filed on Feb. 27, 2020, now U.S. Pat. No. 11,222,749 issued on Jan. 11, 2022, which claims benefit of priority to Korean Patent Application No. 10-2019-0070784 filed on Jun. 14, 2019, the disclosures of which are incorporated herein by reference in their entireties.

BACKGROUND

1. Technical Field

The present disclosure relates to a dielectric ceramic composition having improved reliability and a multilayer ceramic capacitor including the same.

2. Description of Related Art

Generally, electronic components using a ceramic material such as a capacitor, an inductor, a piezoelectric element, a varistor, a thermistor, or the like, include a ceramic body formed of a ceramic material, internal electrodes formed in the body and external electrodes mounted on a surface of the ceramic body to be connected to the internal electrodes.

As there is a recent trend for electronic products to be miniaturized and multifunctionalized along with chip components, there is a need for multilayer ceramic capacitors which are smaller in size but which have greater capacity.

A method for both miniaturizing a multilayer ceramic capacitor and increasing the capacity thereof simultaneously is to reduce thicknesses of the internal dielectric layers and electrode layers to laminate a larger number of the layers. Currently, the thickness of the internal dielectric layer is about 0.6 μm, and there have been efforts to develop thinner dielectric layers.

Under such circumstances, ensuring reliability of dielectric layers is emerging as a major issue of dielectric materials. In addition, difficulties in managing quality and yield have become an issue due to increased degradation of insulation resistance of dielectric materials.

To resolve such problems, there is a need to develop a new method for ensuring high reliability with respect not only to a structure of a multilayer ceramic capacitor, but also a composition of a dielectric.

When a dielectric composition capable of improving the current reliability is secured, a thinner multilayer ceramic capacitor can be manufactured.

SUMMARY

As aspect of the present disclosure relates is to provide a dielectric ceramic composition having improved reliability and a multilayer ceramic capacitor including the same.

According to an aspect of the present disclosure, a dielectric ceramic composition includes a barium titanate (Ba-TiO$_3$)-based base material main ingredient and an accessory ingredient, where the accessory ingredient includes dysprosium (Dy) and niobium (Nb) as first accessory ingredients. A total content of Dy and Nb is greater than 0.2 mol and less than or equal to 1.5 mol based on 100 mol of titanium (Ti) of the base material main ingredient.

According to another aspect of the present disclosure, a multilayer ceramic capacitor includes a ceramic body including dielectric layers and first and second internal electrodes disposed to face each other with respective dielectric layers interposed therebetween, and first and second external electrodes disposed on external surfaces of the ceramic body where the first external electrode is electrically connected to the first internal electrode and the second external electrode is electrically connected to the second internal electrode. The dielectric layers include dielectric grains including a dielectric ceramic composition, and the dielectric ceramic composition includes a BaTiO$_3$-based base material main ingredient and an accessory ingredient, where the accessory ingredient includes Dy and Nb as first accessory ingredients. A total content of Dy and Nb is greater than 0.2 mol and less than or equal to 1.5 mol based on 100 mol of Ti of the base material main ingredient.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
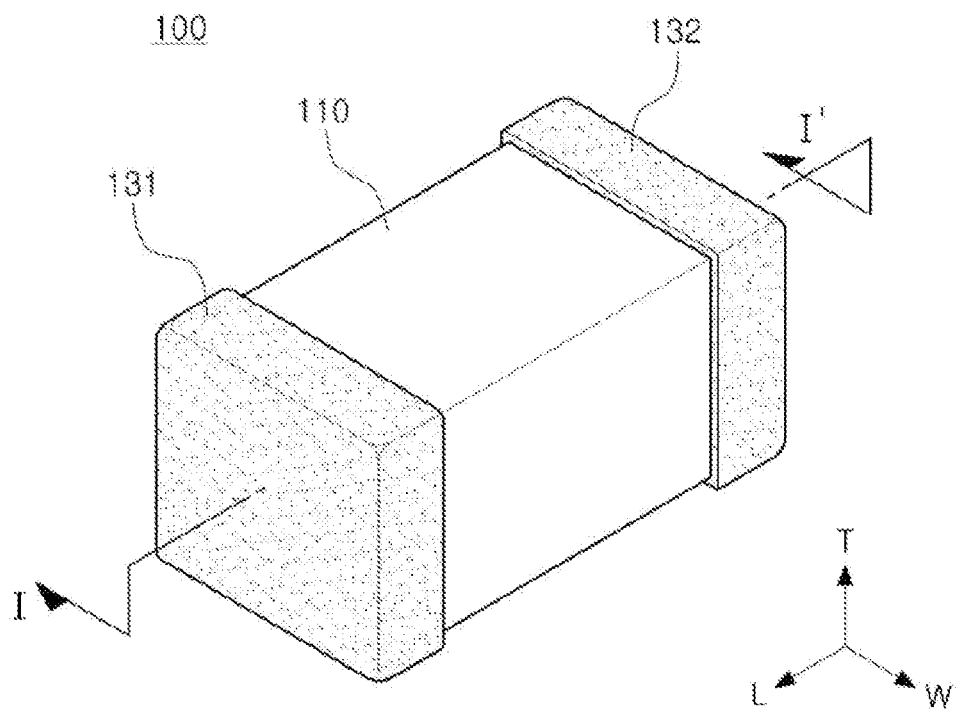
FIG. 1 is a schematic perspective view of a multilayer ceramic capacitor according to an embodiment of the present disclosure.

Hereinafter, embodiments of the present disclosure will be described as follows with reference to the attached drawings. The present disclosure may, however, be embodied in many different forms and should not be construed as being limited to the embodiments set forth herein. Rather, these embodiments are provided so that the present disclosure will be thorough and complete, and will fully convey the scope of the present disclosure to those skilled in the art. In the drawings, the shapes and dimensions of elements may be exaggerated for clarity, and the same reference numerals will be used throughout to designate the same or like elements.

FIG. 1 is a schematic perspective view of a multilayer ceramic capacitor according to an embodiment of the present disclosure.

Figure 2:
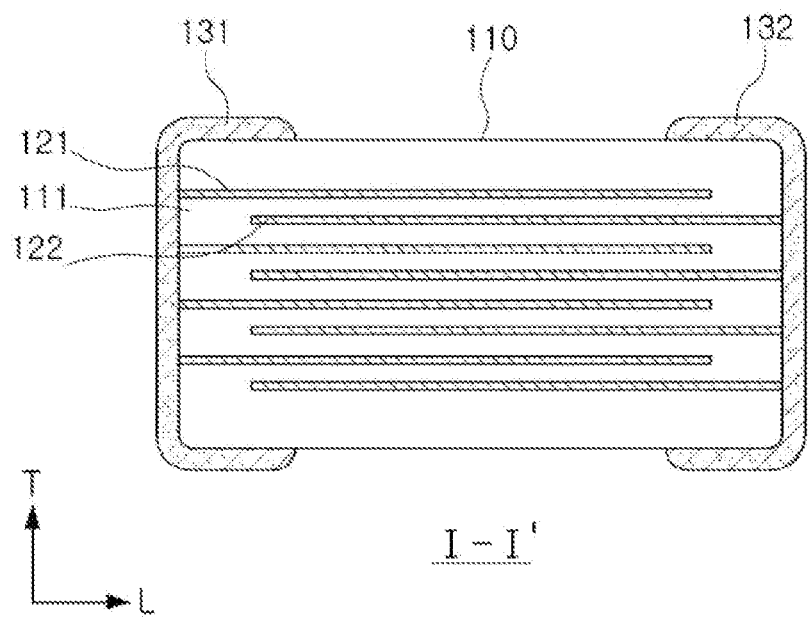
FIG. 2 is a cross-sectional view taken along line I-I' in FIG. 1.

FIG. 2 is a cross-sectional view taken along line I-I' in FIG. 1.

Referring to FIGS. 1 and 2, a multilayer ceramic capacitor 100 according to an embodiment includes a ceramic body 110 including dielectric layers 111 and first and second internal electrodes 121 and 122 disposed to face each other with respective dielectric layers interposed therebetween and first and second external electrodes 131 and 132 disposed on external surfaces of the ceramic body 110. The first external electrode 131 is electrically connected to the first internal electrode 121 and the second external electrode 132 is electrically connected to the second internal electrode 122.

In regard to the multilayer ceramic capacitor 100 according to an embodiment, the "length direction," "width direction," and "thickness direction" of FIG. 1 are defined as an "L" direction, a "W" direction, and a "T" direction, respectively. The "thickness direction" may be used in the same sense as a direction in which the dielectric layers are stacked up, for example, a "lamination direction."

Although not particularly limited, a configuration of the ceramic body 110 may be a rectangular cuboid shape as illustrated in the drawing.

A plurality of the first and second internal electrodes 121 and 122 formed inside the ceramic body 110 have one end exposed to one surface of the ceramic body 110 or the other surface thereof disposed opposite thereto.

The internal electrodes may include a first internal electrode 121 and a second internal electrode 122 having different polarities in pairs.

One end of the first internal electrode 121 may be exposed to one surface of the ceramic body, and one end of the second internal electrode 122 may be exposed to the other surface of the ceramic body disposed opposite thereto.

The first and second external electrodes 131 and 132 are formed on the one surface of the ceramic body 110 and the other surface disposed opposite thereto, respectively, to be electrically connected to the internal electrodes.

Materials of the first and second internal electrodes 121 and 122 are not particularly limited, and may be a conductive paste containing at least one of the elements selected from the group consisting of, for example, silver (Ag), lead (Pb), platinum (Pt), nickel (Ni) and copper (Cu).

The first and second external electrodes 131 and 132 may be electrically connected to the first and second internal electrodes 121 and 122, respectively, to generate capacitance. The second external electrode 132 may be connected to an electric potential different from that connected to the first external electrode 131.

A conductive material contained in the first and second external electrodes 131 and 132 is not particularly limited, but may include at least one element selected from the group consisting of nickel (Ni), copper (Cu), and alloys thereof.

Thicknesses of the first and second external electrodes 131 and 132 may be appropriately determined according to uses thereof, or the like, and are not particularly limited, but may be, for example, 10 μm to 50 μm.

According to an embodiment, a material forming the dielectric layers 111 is not particularly limited as long as sufficient capacitance may be obtained therewith, and is not particularly limited, and may be, for example, barium titanate ($BaTiO_3$) powder.

The material forming the dielectric layers 111 may include various additives, organic solvents, plasticizers, binders, dispersants, and the like, added to $BaTiO_3$ powder, or the like.

The dielectric layers 111, in a sintered state, may be integrated in a single body such that boundaries between neighboring dielectric layers 111 may not be readily apparent.

The first and second internal electrodes 121 and 122 may be formed on the dielectric layers 111, and the internal electrodes 121 and 122 may be formed inside the ceramic body 110 by sintering while having one dielectric layer therebetween.

A thickness of the dielectric layer 111 may be optionally changed according to capacity design of the capacitor. A thickness of the dielectric layer in an embodiment after sintering may be 0.4 μm or less per layer.

Further, thicknesses of the first and second internal electrodes 121 and 122 after the sintering may be 0.4 μm or less per layer.

According to an embodiment, the dielectric layers 111 include dielectric grains including a dielectric ceramic composition. The dielectric ceramic composition includes a $BaTiO_3$-based base material main ingredient (base material main ingredient) and an accessory ingredient, where the accessory ingredient includes dysprosium (Dy) and niobium (Nb) as first accessory ingredients. A total content of Dy and Nb in the dielectric ceramic composition may be greater than 0.2 mol and less than or equal to 1.5 mol based on 100 mol of titanium (Ti) of the base material main ingredient.

Relatively, many rare-earth elements are generally added to the dielectric composition used for the dielectric layer 111 to secure reliability of the dielectric inside the multilayer ceramic capacitor.

Dysprosium (Dy) among such rare-earth elements decreases an oxygen vacancy concentration while substituting a barium (Ba)-site when Dy is added to $BaTiO_3$ of the base-material main ingredient. Thus, Dy is known to have an effect of improving reliability.

On the other hand, when a rare-earth element having an ion radius is larger than that of Dy, for example, lanthanum (La), samarium (Sm), or the like, is added to the dielectric ceramic composition, an oxygen vacancy concentration is more effectively decreased as the Ba-site may be more effectively substituted. In this case, however, the rare-earth element may not be able to actually apply due to insulation resistance rapidly reduced by excessive semiconductorization.

Accordingly, it is considered that novel rare-earth elements may be added to the dielectric ceramic composition to secure insulation resistance while minimizing oxygen vacancy concentration to improve reliability.

In an embodiment, an optimal content ratio of the rare-earth elements may be determined to secure excellent reliability by including Nb in addition to Dy in the dielectric ceramic composition, which show stable dielectric characteristics.

According to an embodiment, the dielectric ceramic composition includes a $BaTiO_3$-based base material main ingredient (base material main ingredient) and an accessory ingredient. The accessory ingredient includes Dy and Nb as the first accessory ingredients. In this case, a total content of the Dy and Nb is greater than 0.2 mol and less than or equal to 1.5 mol based on 100 mol of Ti of the base material main ingredient.

The reliability such as insulation resistance, or the like, may be improved by adjusting the total content of Dy and Nb in the dielectric ceramic composition to be greater than 0.2 mol and less than or equal to 1.5 mol based on 100 mol of Ti of the base material main ingredient.

When the total content of the Dy and Nb in the dielectric ceramic composition is 0.2 mol or less based on 100 mol of Ti of the base material main ingredient, the total content of the rare-earth elements Dy and Nb is too little and thus, a reliability improvement effect is not significant.

In terms of reliability improvement, it is more advantageous as the total content of the Dy and Nb in the dielectric ceramic composition increases; however, the Dy and Nb are semiconductorized at a certain amount or more, thereby deteriorating the characteristics of an insulator as well as sinterability. Accordingly, the total content of Dy and Nb in the dielectric ceramic composition may be 1.5 mol or less based on 100 mol of Ti of the base material main ingredient.

In other words, when the total content of the Dy and Nb in the dielectric ceramic composition exceeds 1.5 mol based on 100 mol of Ti of the base material main ingredient, lack of sinterability resulting from the excessive content of the rare-earth elements may cause problems of an insufficient capacity and reliability deterioration.

In detail, according to an embodiment, the Nb content in the dielectric ceramic composition may satisfy 0.05 mol Nb≤0.20 mol based on 100 mol of Ti of the base material main ingredient.

When the Nb content in the dielectric ceramic composition satisfies 0.05 mol≤Nb≤0.20 mol based on 100 mol of Ti of the base material main ingredient, the reliability improvement effect such as insulation resistance improvement may be excellent.

When the Nb content in the dielectric ceramic composition is less than 0.05 mol based on 100 mol of Ti of the base material main ingredient, the Nb content is too little and thus the reliability improvement effect may not be significant.

On the other hand, when the Nb content in the dielectric ceramic composition exceeds 0.20 mol based on 100 mol of Ti of the base material main ingredient, insulation resistance may be reduced due to semiconductorization.

According to an embodiment, with respect to the dielectric ceramic composition included in dielectric layers in the ceramic body, high dielectric characteristics may be obtained and the reliability such as insulation resistance may be improved by including rare-earth elements Dy and Nb as accessory ingredients while controlling the contents thereof.

According to an embodiment, Nb may be disposed at a boundary of the dielectric grain.

Disposed at the boundary of the dielectric grain, Nb may inhibit a reduction in the insulation resistance of the multilayer ceramic capacitor, thereby improving reliability.

The multilayer ceramic capacitor 100 according to an embodiment is a miniaturized product with high capacity, and includes a dielectric layer 111 having a thickness of 0.4 μm or less and the first and second electrodes 121 and 122 having a thickness of 0.4 μm or less, but the thickness is not particularly limited thereto. The thickness of the dielectric layer 111 is more than 0.0 μm.

Additionally, a size of the multilayer ceramic capacitor 100 may be 1005 (length×width, 1.0 mm×0.5 mm) or less.

For example, as the multilayer ceramic capacitor 100 according to an embodiment is a miniaturized product with high capacity, the thicknesses of the dielectric layers 111 and the first and second internal electrodes 121 and 122 are thinner than those of related art products. With respect to such a product to which thin film dielectric layers and internal electrodes are applied, research for improving reliability such as insulation resistance is a significantly important issue.

In detail, as related art multilayer ceramic capacitors have comparatively thicker dielectric layers and internal electrodes compared to the multilayer ceramic capacitor according to an embodiment, reliability is not a big issue even though a composition of the dielectric ceramic composition is the same as that of the related art.

However, in regard to a product of a multilayer ceramic capacitor to which thin film dielectric layers and internal electrodes are applied as in an embodiment of the present disclosure, reliability of the multilayer ceramic capacitor is important, and it is necessary to adjust the composition of the dielectric ceramic composition.

For example, in an embodiment, even when the dielectric layer 111 is a thin film having a thickness of 0.4 μm or less, reliability such as insulation resistance may be improved by including Dy and Nb as the first accessory ingredients and adjusting the total content thereof to be greater than 0.2 mol and be equal to or less than 1.5 mol based on 100 mol of Ti of the base material main ingredient, and in more detail, by adjusting the Nb content to satisfy 0.05 mol≤Nb 0.20 mol based on 100 mol of Ti of the base material main ingredient.

In this case, however, the thin film does not mean that the thicknesses of the dielectric layers 111 and internal electrodes 121 and 122 are 0.4 μm or less, and may be understood in a sense that the dielectric layers and internal electrodes are thinner than those of related art products.

Hereinafter, each ingredient of the dielectric ceramic composition according to an embodiment will be described in more details.

(a) Base Material Main Ingredient

The dielectric ceramic composition according to an embodiment of the present disclosure may include a base material main ingredient represented by $BaTiO_3$.

According to an embodiment, the base material main ingredient includes at least one compound selected from the group consisting of $BaTiO_3$, $(Ba_{1-x}Ca_x)(Ti_{1-y}Ca_y)O_3$ (where 0≤x≤0.3, 0≤y≤0.1), $(Ba_{1-x}Ca_x)(Ti_{1-y}Zr_y)O_3$ (where 0≤x≤0.3, 0≤y≤0.5), and $Ba(Ti_{1-y}Zr_y)O_3$ (where 0<y≤0.5), but is not necessarily limited thereto.

The dielectric ceramic composition according to an embodiment may have room-temperature permittivity of 2000 or above.

The base material main ingredient is not particularly limited, but an average diameter of the main ingredient powder may be 40 nm or above and 200 nm or less.

b) First Accessory Ingredient

According to an embodiment of the present disclosure, the dielectric ceramic composition includes Dy and Nb as elements of the first accessory ingredients.

The first accessory ingredient serves to inhibit reliability deterioration of the multilayer ceramic capacitor to which the dielectric ceramic composition is applied in an embodiment.

According to an embodiment, reliability such as insulation resistance can be improved even when the thickness of the dielectric layer 111 is 0.4 μm or less, by including Dy and Nb as the first accessory ingredients, adjusting the total content of Dy and Nb in the dielectric ceramic composition to be greater than 0.2 mol and 1.5 mol or less based on 100 mol of Ti of the base material main ingredient, and in more detail, adjusting the Nb content in the dielectric ceramic composition to satisfy 0.05 mol≤Nb≤0.20 mol based on 100 mol of Ti of the base material main ingredient. The Nb content of the present disclosure may be the Nb content included in the dielectric layer 111. The total content of Dy and Nb of the preset disclosure may be the total content of Dy and Nb included in the dielectric layer 111. The Nb content of the present disclosure may be an atom percent (at. %) of Nb in the dielectric composition based on 100 mol % of Ti of the base material main ingredient in the dielectric composition.

c) Second Accessory Ingredient

According to an embodiment of the present disclosure, the dielectric ceramic composition may include one or more oxides including at least one element selected from the group consisting of manganese (Mn), vanadium (V), chromium (Cr), iron (Fe), nickel (Ni), cobalt (Co), copper (Cu) and zinc (Zn) and/or one or more carbonates including at least one element selected from the group consisting of Mn, V, Cr, Fe, Ni, Co, Cu and Zn as the second accessory ingredient.

As the second accessory ingredient, a total amount of the oxides including at least one element selected from the group consisting of Mn, V, Cr, Fe, Ni, Co, Cu and Zn and the carbonates including at least one element selected from the group consisting of Mn, V, Cr, Fe, Ni, Co, Cu and Zn may be included in an amount of 0.1 mol to 2.0 mol based on 100 mol of Ti of the base material main ingredient.

The second accessory ingredient serves to lower a firing temperature and enhance high temperature-withstand voltage characteristics of the multilayer ceramic capacitor to which the dielectric ceramic composition is applied.

The contents of the second accessory ingredient and third and fourth accessory ingredients described in the present disclosure may be the amounts contained in the dielectric ceramic composition based on 100 mol of the base material powder, and may be defined as moles of metal ions in which respective accessory ingredients are contained. The contents of the second accessory ingredient and third and fourth accessory ingredients of the present disclosure may be the contents included in the dielectric layer 111.

When the content of the second accessory ingredient is less than 0.1 mol, the firing temperature increases and the high temperature-withstand voltage characteristics somewhat decreases.

When the content of the second accessory ingredient is greater than 2.0 mol, the high temperature-withstand voltage and room-temperature specific resistance may deteriorate.

In detail, the dielectric ceramic composition according to an embodiment may include 0.1 mol to 2.0 mol, inclusive, of the second accessory ingredient based on 100 mol of the base material main ingredient. This will enable firing at a low temperature and provide the high temperature-withstand voltage characteristics.

Third Accessory Ingredient

According to an embodiment of the present disclosure, the dielectric ceramic composition may include a third accessory ingredient, which is an oxide and/or carbonate including a fixed-valence acceptor element of magnesium (Mg).

The fixed-valence acceptor element Mg may be included as the third accessory ingredient in an amount of 0.2 mol to 0.7 mol, inclusive, based on based on 100 mol of Ti of the base material main ingredient.

The third accessory ingredient, as a fixed-valence acceptor element or compounds including the same, serves as an acceptor to decrease an electron concentration. The reliability improvement effect due to n-type may be significantly increased by adding 0.2 mol to 0.7 mol, inclusive, of the fixed-valence acceptor element Mg, which is the third accessory ingredient, based on 100 mol of Ti of the base material main ingredient.

When the content of the third accessory ingredient is greater than 0.7 mol based on 100 mol of Ti of the base material main ingredient, the permittivity may decrease and a dielectric breakdown voltage (BDV) may decrease, which may be problematic.

Fourth Accessory Ingredient

According to an embodiment of the present disclosure, the dielectric ceramic composition may include, as the fourth accessory ingredient, one or more oxides including at least one element of silicon (Si) or aluminum (Al), or a glass compound including Si.

The dielectric ceramic composition may further include 0.5 mol or less and more than 0.0 mol of the fourth accessory ingredient, which includes one or more oxides including at least one element of Si or Al, or a glass compound including Si, based on 100 mol of the base material main ingredient.

The fourth accessory ingredient content may be the content of the elements of Si and Al contained in the dielectric ceramic composition as the fourth accessory ingredient regardless of an additional form such as glass, oxides or carbonates.

The fourth accessory ingredient serves to lower a firing temperature and improve high-temperature withstand voltage characteristics of the multilayer ceramic capacitor to which the dielectric ceramic composition is applied.

When the fourth accessory ingredient content exceeds 0.5 mol based on 100 mol of the base material main ingredient, there may be problems such as decreased sinterability and density, secondary phase formation, or the like, which may be problematic.

In detail, according to an embodiment, when the dielectric ceramic composition contains 0.5 mol or less of Al, Al serves as an acceptor and decreases the electron concentration, thereby improving reliability.

Hereinafter, the present disclosure will be described in more detail with respect to the embodiments of the present disclosure and comparative examples. These embodiments and comparative examples are provided to assist in a comprehensive understanding of the invention, and should not be construed as being limited to the embodiments set forth herein.

EMBODIMENT EXAMPLES

A dielectric layer were formed by adding an additive such as Dy, Nb, Al, Mg, Mn, or the like, a binder and an organic solvent, such as ethanol, to dielectric powder particles containing $BaTiO_3$ as a base material main ingredient, and wet-mixing the same to prepare a dielectric slurry followed by spreading and drying the dielectric slurry on a carrier film to prepare a ceramic green sheet.

All element additives having a particle size of 40% or less based on $BaTiO_3$ were monodispersed and added.

In the Embodiment Examples of the present disclosure, a multilayer ceramic capacitor was manufactured such that the total content of Dy and Nb in the dielectric slurry was greater than 0.2 mol and less than or equal to 1.5 mol based on 100 mol of Ti of the base material main ingredient; in detail, the Nb content satisfied $0.05\ mol \leq Nb \leq 0.20\ mol$ based on 100 mol of Ti of the base material main ingredient.

The total content of Dy and Nb added to the dielectric slurry (i.e., the total content of Dy and Nb in the dielectric ceramic composition) in Embodiment Example 1 was 1.5 mol based on 100 mol of Ti of the base material main ingredient.

The Nb contents added to the dielectric slurry (i.e., the total content of Dy and Nb in the dielectric ceramic composition) in Embodiment Examples 2 to 4 respectively were 0.05 mol, 0.1 mol and 0.20 mol, respectively, based on 100 mol of Ti of the base material main ingredient.

The ceramic green sheet was fabricated as a sheet having a thickness of several micrometers by mixing the ceramic powder, a binder and a solvent to prepare a slurry and using the slurry subjected to a doctor blade method.

Then, a conductive paste for internal electrodes including 40 parts by weight to 50 parts by weight of nickel powder having an average particle size of 0.1 μm to 0.2 μm was prepared.

The conductive paste for internal electrodes was screen-printed on the ceramic green sheets to form internal electrodes. The green sheets on which internal electrode patterns were formed were then laminated to form a laminate followed by compressing and cutting the laminate.

Then, the cut laminate was heated to remove the binder, and fired in a high-temperature reducing atmosphere to form a ceramic body.

During the firing process, a heat treatment was performed by firing in a reducing atmosphere (0.1% $H_2$/99.9% $N_2$, $H_2O/H_2/N_2$) at 1100° C. to 1200° C. for 2 hours followed by reoxidation in a nitrogen ($N_2$) atmosphere at 1000° C. for 3 hours.

A copper (Cu) paste was used to perform a termination process and electrode firing for the fired ceramic body, and external electrodes were formed.

In addition, the dielectric layers 111 and the first and second internal electrodes 121 and 122 inside the ceramic body 110 were manufactured so as to have a thickness of 0.4 μm or less after firing.

Comparative Example 1

In Comparative Example 1, the total content of Dy and Nb in the dielectric ceramic composition was 1.8 mol, which exceeds 1.5 mol, based on 100 mol of Ti of the base material main ingredient. The remaining manufacturing process was the same as that previously described.

Comparative Example 2

In Comparative Example 2, the total content of Dy and Nb in the dielectric ceramic composition was 2.1 mol, which is exceeds 1.5 mol, based on 100 mol of Ti of the base material main ingredient. The remaining manufacturing process was the same as that previously described.

Comparative Example 3

In Comparative Example 3, Nb was not added in a dielectric layer as the related art multilayer ceramic capacitor. The remaining manufacturing process was the same as that previously described.

Comparative Example 4

In Comparative Example 4, 0.25 mol of Nb was added to the dielectric slurry (i.e., the total content of Dy and Nb in the dielectric ceramic composition), based on 100 mol of Ti of the base material main ingredient. The remaining manufacturing process was the same as previously described.

HALT testing was performed for samples of prototype multilayer ceramic capacitors (prototype MLCC) manufactured in Examples 1 to 4 and Comparative Examples 1 to 4 as described above.

Figure 3A:
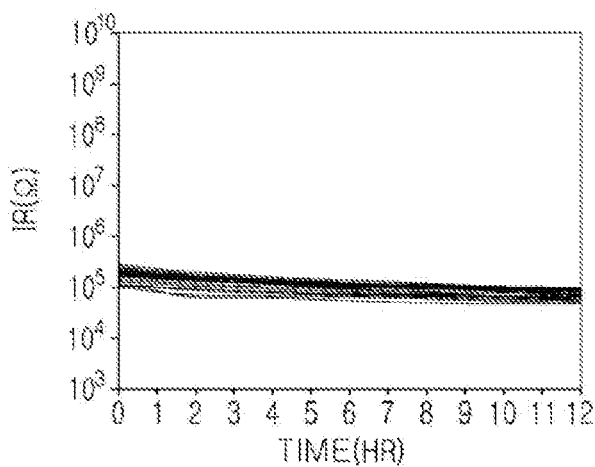
FIGS. 3A to 3C are graphs of high accelerated life test (HALT) testing results according to the Embodiment Examples of the present disclosure and Comparative Examples.
Figure 3B:
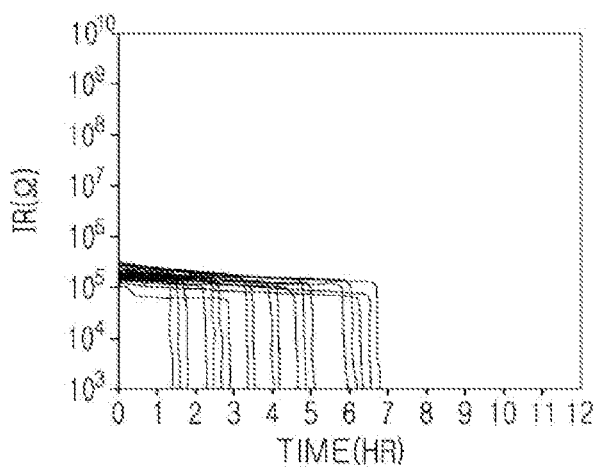
Figure 3C:
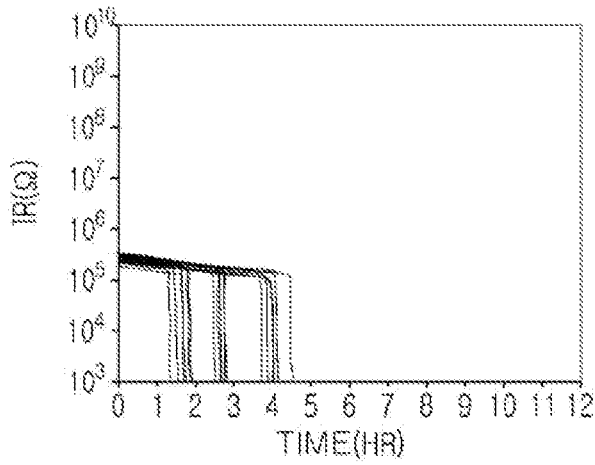

FIGS. 3A to 3C are graphs of HALT testing results according to the Embodiment Examples of the present disclosure and Comparative Examples.

FIG. 3A represents Embodiment Example 1 of the multilayer ceramic capacitor samples, in which the total content of Dy and Nb was 1.5 mol based on 100 mol of Ti of the base material main ingredient. The HALT testing shows the excellent reliability with no defect.

In the case of Embodiment Example 1, a normal capacity is 101% and BDV was 63V, indicating excellent reliability in terms of capacity and BDV.

FIG. 3B represents Comparative Example 1, in which the total content of Dy and Nb was 1.8 mol, which exceeds 1.5 mol, based on 100 mol of Ti of the base material main ingredient, and FIG. 3C represents Comparative Example 2, in which the total content of Dy and Nb was 2.1 mol, which exceeds 1.5 mol, based on 100 mol of Ti of the base material main ingredient.

In both cases of Comparative Examples 1 and 2, several defects were observed in the HALT testing, indicating decreased reliability.

Further, normal capacity was 90% and BDV was 58V in Comparative Example 1, and normal capacity was 82% and BDV was 47V in Comparative Example 2, indicating substandard reliability.

FIGS. 4A to 4E are graphs of HALT testing results according to the Embodiment Examples of the present disclosure and Comparative Examples.

Figure 4A:
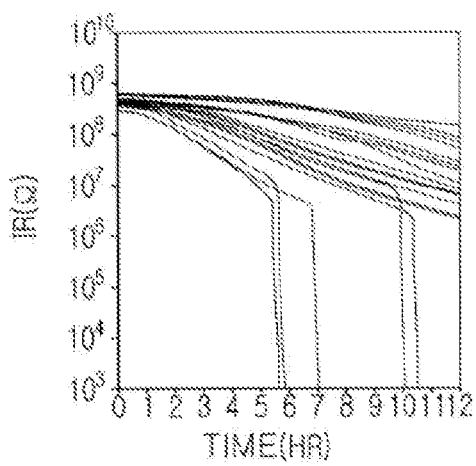
FIGS. 4A to 4E are graphs of HALT testing results according to the Embodiment Examples of the present disclosure and Comparative Examples.

FIG. 4A represents Comparative Example 3, in which Nb was not added as in the related art. Several defects were detected in the HALT testing, indicating decreased reliability.

Figure 4B:
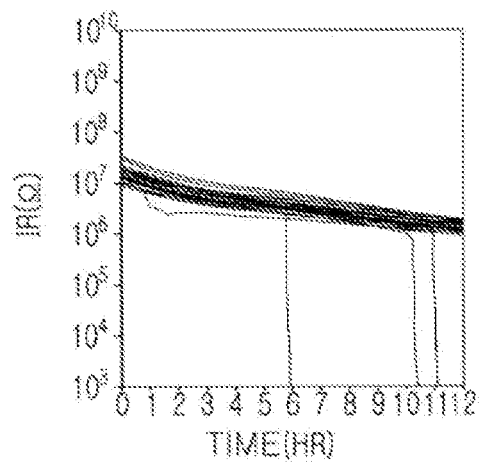
Figure 4C:
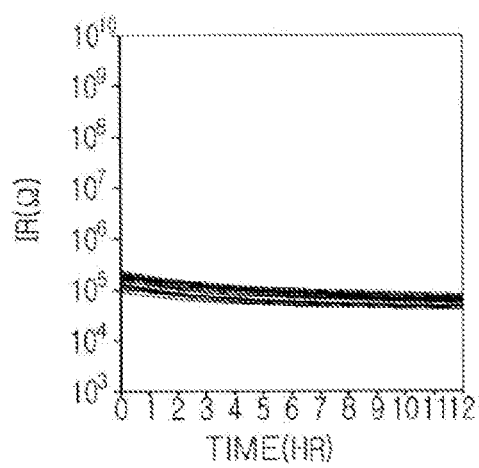
Figure 4D:
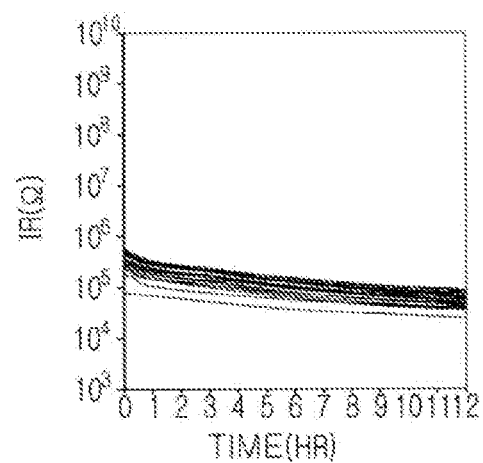

FIGS. 4B to 4D represent Embodiment Examples 2 to 4, in which 0.05 mol, 0.1 mol and 0.20 mol of Nb were added based on 100 mol of Ti of the base material main ingredient, respectively. The HALT testing showed no or a minimum number of defects, indicating excellent reliability.

Figure 4E:
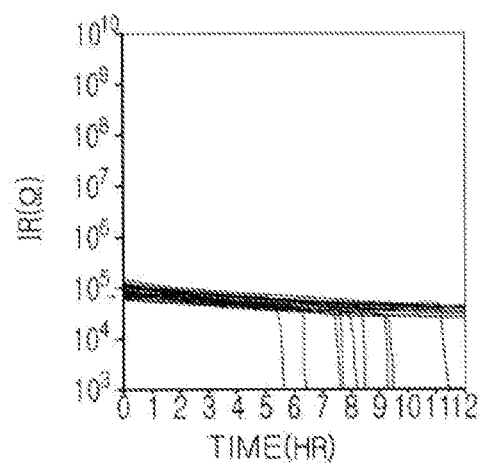

FIG. 4E represents Comparative Example 4, in which the Nb content was 0.25 mol based on 100 mol of Ti of the base material main ingredient. Several defects were detected in the HALT testing, indicating decreased reliability.

According to an embodiment, a dielectric ceramic composition included in a dielectric layer in a ceramic body may have improved reliability such as improved insulation resistance by including as an accessory ingredient a novel rare-earth element Nb while controlling the content thereof.

While example embodiments have been shown and described above, it will be apparent to those skilled in the art that modifications and variations could be made without departing from the scope of the present disclosure as defined by the appended claims.

What is claimed is:

1. A multilayer ceramic capacitor, comprising:
    a ceramic body comprising dielectric layers and first and second internal electrodes disposed to face each other with respective dielectric layers interposed therebetween; and
    a first external electrode and a second external electrode disposed on external surfaces of the ceramic body, the first external electrode being connected to the first internal electrode and the second external electrode being connected to the second internal electrode,
    wherein the dielectric layers comprise dielectric grains comprising a dielectric ceramic composition,
    the dielectric ceramic composition comprises a barium titanate (BaTiO3)-based base material main ingredient and an accessory ingredient,
    the accessory ingredient comprising dysprosium (Dy) and niobium (Nb) as first accessory ingredients,
    wherein a total content of the Dy and Nb is greater than 0.2 mol and less than or equal to 1.5 mol based on 100 mol of titanium (Ti) of the barium titanate-based base material main ingredient, and
    wherein a thickness of at least one of the dielectric layers is 0.4 μm or less and a thickness of at least one of the first or second internal electrode is 0.4 μm or less.

2. The multilayer ceramic capacitor of claim 1, wherein a content of the Nb satisfies 0.05 mol≤Nb≤0.20 mol based on 100 mol of Ti of the barium titanate base material main ingredient.

3. The multilayer ceramic capacitor of claim 1, wherein the dielectric ceramic composition comprises 0.1 mol to 2.0 mol, inclusive, of a second accessory ingredient based on 100 mol of the barium titanate base material main ingredient,
wherein the second accessory ingredient comprises one or more oxides comprising at least one element selected from the group consisting of manganese (Mn), vanadium (V), chromium (Cr), iron (Fe), nickel (Ni), cobalt (Co), copper (Cu) and zinc (Zn) and/or one or more carbonates comprising at least one element selected from the group consisting of Mn, V, Cr, Fe, Ni, Co, Cu and Zn.

4. The multilayer ceramic capacitor of claim 1, wherein the dielectric ceramic composition comprises 0.2 mol to 0.7 mol, inclusive, of a third accessory ingredient based on 100 mol of Ti of the barium titanate base material main ingredient,
wherein the third accessory ingredient is an oxide or carbonate comprising a fixed-valence acceptor element of magnesium (Mg).

5. The multilayer ceramic capacitor of claim 1, wherein the dielectric ceramic composition comprises 0.001 mol to 0.5 mol of a fourth accessory ingredient based on 100 mol of the barium titanate base material main ingredient,
wherein the fourth accessory ingredient comprises one or more oxides comprising at least one element of silicon (Si) or aluminum (Al), or a glass compound comprising Si.

6. The multilayer ceramic capacitor of claim 1, wherein a size of the multilayer ceramic capacitor is 1005 (length× width, 1.0 mm×0.5 mm) or less.

7. The multilayer ceramic capacitor of claim 1, wherein Nb is disposed at a boundary of the dielectric grain.

8. The multilayer ceramic capacitor of claim 1, wherein the dielectric ceramic composition comprises one or more oxides or carbonates comprising at least one element selected from the group consisting of Cr, Fe, Ni, Co and Cu.

* * * * *